G. T. RIDINGS.
Tire Machine.
No. 56,269. Patented July 10, 1866.
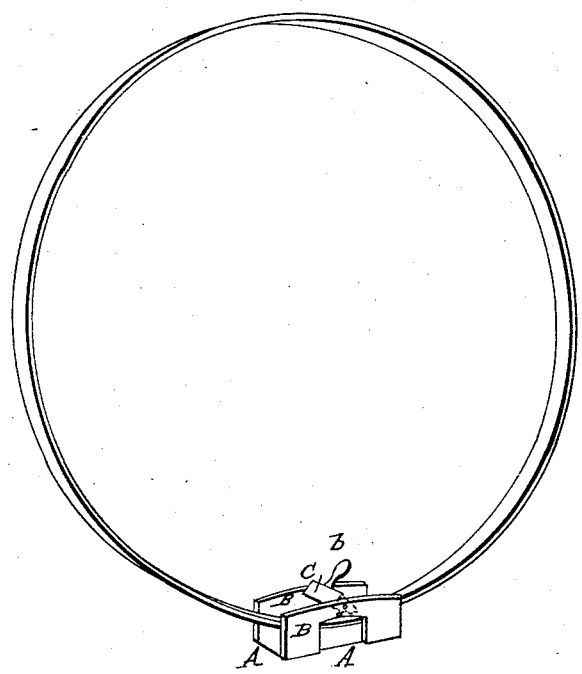
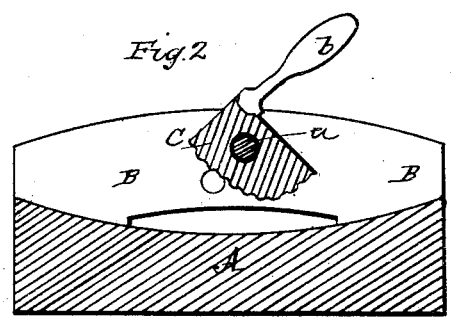
WITNESSES
S. M. Randolph
A. Wagner
INVENTOR
George T. Ridings
By his attorney
M. Randolph

UNITED STATES PATENT OFFICE.

GEORGE T. RIDINGS, OF SHELBYVILLE, MISSOURI.

IMPROVEMENT IN TIRE-MACHINES.

Specification forming part of Letters Patent No. 56,269, dated July 10, 1866.

*To all whom it may concern:*

Be it known that I, GEORGE T. RIDINGS, of Shelbyville, in the county of Shelby and State of Missouri, have invented a new and useful Machine for Upsetting Wagon-Tires; and I do hereby declare that the following is a full and clear description thereof, reference being had to the accompanying drawings, and to the letters of reference marked thereon.

Figure 1 of the annexed drawings represents one of the machines attached to a tire as it would appear while being used. Fig. 2 is a sectional elevation of one of the machines.

It is a well-known fact that the tires of wagons, carriages, and all other land conveyances in a short time become loosened by wear and the shrinkage of the wooden parts of the wheels they surround, and it therefore becomes necessary to shorten the tires in such cases, so as to make them fit tightly to the fellies of the wheels, in order that they may strengthen the wheels, as they did in the original construction of the same. The common practice in such cases is to cut the tire in two and then weld it together again, thus making it of the required size.

A more simple plan of accomplishing the same result has recently been adopted by heating a portion of the tire and then placing it in a machine which was arranged to force the tire from either side of the heated place to the part thus heated, thereby accomplishing the desired shortening by the operation which is commonly known among mechanics as "upsetting."

The machines which have already been patented for this purpose are found to be too expensive. Therefore the present machine is considered preferable for this purpose to any of the kind now in use.

To enable those skilled in the art to make and use my machine, I will proceed to describe its construction and operation.

It consists of a simple block of iron, A, six or eight inches long, more or less, the face of which should be somewhat concave, so as to more nearly fit the exterior of the tire. On each edge of this block there is a lip or jaw, B, projecting upward from the concave side of it sufficiently to receive the clamp C, which is placed between the two jaws, and secured there by the pin a, which passes through the three parts. The pin a, being round, forms a journal, around which the clamp C may revolve. The clamp is eccentrical in form and the curved portion of it corrugated, as clearly shown in Fig. 2. A small handle or lever, b, is attached to the upper part of the clamp for the purpose of manipulating it.

The block A and jaws B may be made in three parts and bolted together; but I prefer casting them in one piece of malleable iron. The clamp C and its lever b may be made of the same material.

The pin a should be arranged so it may be easily withdrawn and replaced. Two or more sets of holes may be made in the jaws B for the insertion of the pin a, so as to accommodate tires of different thicknesses in the same machine.

When this machine is to be used the pin and clamp are to be withdrawn, and the tire to be operated upon placed between the jaws, when the clamp C will be replaced and the lever b pressed so as to turn the highest part of the eccentric clamp down onto the tire, which it will press against the block A with great force and there hold it fast. The tire having previously been heated a short distance from the point where the machine is placed upon it, it may be fastened in a vise or held against an anvil on the opposite side of the heated part, when repeated blows from a hammer on the end of the block A will cause the required shortening of the tire by upsetting it at the heated point.

Having described my invention, what I claim is—

The combination of the block A B with the eccentric clamp C, when employed as and for the purpose set forth.

GEORGE T. RIDINGS.

Witnesses:
  M. RANDOLPH,
  A. WAGNER.